(12) United States Patent
Bhattacharya et al.

(10) Patent No.: US 10,778,668 B2
(45) Date of Patent: Sep. 15, 2020

(54) HTTP SESSION VALIDATION MODULE

(71) Applicant: Dell Products L.P., Round Rock, TX (US)

(72) Inventors: Abhijeet Bhattacharya, Bangalore (IN); Rajeev Arakkal, Kozhikode (IN)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 15/613,062

(22) Filed: Jun. 2, 2017

(65) Prior Publication Data

US 2018/0351936 A1    Dec. 6, 2018

(51) Int. Cl.
*H04L 29/06*    (2006.01)
*H04L 29/08*    (2006.01)

(52) U.S. Cl.
CPC ........ *H04L 63/083* (2013.01); *H04L 63/0245* (2013.01); *H04L 63/10* (2013.01); *H04L 63/12* (2013.01); *H04L 65/1069* (2013.01); *H04L 67/141* (2013.01); *H04L 67/146* (2013.01); *H04L 63/062* (2013.01); *H04L 63/1483* (2013.01); *H04L 63/168* (2013.01); *H04L 67/02* (2013.01)

(58) Field of Classification Search
CPC ... H04L 63/083; H04L 63/0245; H04L 63/10; H04L 63/12; H04L 65/1069; H04L 67/141; H04L 67/146; H04L 63/062; H04L 63/1483; H04L 63/168; H04L 67/02
See application file for complete search history.

(56) References Cited

U.S. PATENT DOCUMENTS

| | | | | |
|---|---|---|---|---|
| 7,437,550 B2* | 10/2008 | Savage | ................ | G06Q 20/383 713/156 |
| 7,502,835 B1* | 3/2009 | Cheng | .................... | H04L 63/08 709/217 |
| 8,291,228 B2* | 10/2012 | Laidlaw | .................. | H04L 63/08 713/176 |
| 8,301,876 B2* | 10/2012 | Burch | .................... | H04L 63/08 705/75 |
| 8,423,650 B2* | 4/2013 | Doleh | ................. | H04L 67/2814 709/227 |
| 8,448,233 B2* | 5/2013 | Shulman | ............. | H04L 63/1425 713/176 |
| 8,640,202 B2* | 1/2014 | Roy | ...................... | G06F 21/335 726/2 |

(Continued)

*Primary Examiner* — Joseph P Hirl
*Assistant Examiner* — Stephen T Gundry
(74) *Attorney, Agent, or Firm* — Jackson Walker L.L.P.

(57) ABSTRACT

A web server receives a packet including a web request from a browser of a client. The request includes a session cookie comprising a client token and a session identifier. A secret session token is calculated based on the session identifier and header data that includes data from one or more packet header fields. The web request is processed if the secret session token matches the client token and blocked otherwise. Determining the secret session token may include hashing the session identifier, at least a portion of a user agent string included in a user agent header of the web request, and at least a portion of a source IP address included in an IP header of the packet. The secret session token may have been provided to the client as a session cookie included in a response to an initial web request from the client.

20 Claims, 4 Drawing Sheets

(56) References Cited

U.S. PATENT DOCUMENTS

| | | | | |
|---|---|---|---|---|
| 8,806,029 B2* | 8/2014 | Chen | ............ | H04L 67/14 |
| | | | | 709/228 |
| 8,850,219 B2* | 9/2014 | Dapkus | ............ | G06F 21/577 |
| | | | | 713/185 |
| 8,959,650 B1* | 2/2015 | Richards | ............ | G06F 21/44 |
| | | | | 709/227 |
| 9,058,214 B2* | 6/2015 | Ragusa | ............ | G06F 9/5027 |
| 9,444,620 B1* | 9/2016 | Murphy | ............ | H04L 9/0822 |
| 10,097,525 B2* | 10/2018 | Froelicher | ............ | H04L 63/062 |
| 2002/0133723 A1* | 9/2002 | Tait | ............ | H04L 63/029 |
| | | | | 726/10 |
| 2009/0094688 A1* | 4/2009 | Roy | ............ | G06F 21/335 |
| | | | | 726/7 |
| 2009/0319776 A1* | 12/2009 | Burch | ............ | H04L 63/08 |
| | | | | 713/155 |
| 2011/0093603 A1* | 4/2011 | Cheng | ............ | H04L 63/08 |
| | | | | 709/229 |
| 2011/0283110 A1* | 11/2011 | Dapkus | ............ | G06F 21/577 |
| | | | | 713/182 |
| 2012/0226813 A1* | 9/2012 | Ragusa | ............ | G06F 9/5027 |
| | | | | 709/227 |
| 2013/0007194 A1* | 1/2013 | Doleh | ............ | H04L 67/2814 |
| | | | | 709/217 |
| 2013/0055384 A1* | 2/2013 | Shulman | ............ | H04L 63/1425 |
| | | | | 726/22 |
| 2017/0264600 A1* | 9/2017 | Froelicher | ............ | H04L 63/062 |
| 2018/0248843 A1* | 8/2018 | Akef | ............ | H04L 67/02 |

* cited by examiner

HTTP SESSION VALIDATION MODULE

TECHNICAL FIELD

The present disclosure generally relates to Internet security and, more specifically, methods and systems for validating requests received by a Web server.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

Information handling systems that communicate via the Internet raise a number of security concerns. One particular practice that raises security concerns is the use of Session IDs by HTTP-based applications. Because HTTP is a stateless protocol, any information required by the recipient of an HTTP request must be either included in the request itself, maintained by the recipient, or provided to the recipient outside of the request itself.

SUMMARY

Disclosed subject matter improves/addresses security risks associated with session identifiers (session IDs).

In accordance with disclosed subject matter, an information handling system configured with web server functionality receives a network packet, e.g., an IP packet, including an HTTP-compliant request, sometimes referred to herein simply as a web request, from a client web browser. The web request includes or otherwise indicates a token and a session ID, which may be referred to as the request token and request session ID respectively. The information handling system may generate, calculate, or otherwise determine a secret session token (SST) based on the request session ID and header data. The header data includes data from one or more header fields included in any one or more of: an IP header, a transport layer header, an HTTP header, and/or another suitable header of the web request. If a session validation feature of the web server is enabled, information handling system processes the web request if and only if the SST calculated based on the header data matches the request token provided with the web request. If the SST and the request token fail to match, the web server blocks or otherwise declines to process the web request.

Determining the SST may include performing a hash function or hash algorithm using some or all of: a session ID, a user agent string included in a user agent field of an HTTP header for the web request, and a source IP address included in an IP header of the packet. The SST may have been provided to the client as a session cookie included in a response to an initial web request from the client.

In accordance with further disclosed subject matter, a web server includes a processor, a network interface suitable for coupling the web server to the Internet or another suitable network, and a software in the form of a computer readable medium including processor executable instructions. The software, when executed by the processor, causes the processor to perform particular operations.

The particular operations performed by the web server may include, responsive to receiving an initial request from a web client, extracting from the request one or more data items indicative of a source of the initial request, and generating a session ID corresponding to the request. An SST is generated, based on the data items and the session ID, and a response to the initial request is sent, wherein the response includes the session ID and the SST, e.g., within a set-cookie field of an HTTP header of the response.

Upon subsequently receiving an in-session request, i.e., a web request that includes a session ID, purportedly from the same client web browser and/or associated with the same HTTP session, the web server processes the request only after validating a session ID included in the request by calculating an SST based on the request and verifying that the calculated SST matches a token included with the request.

If session validation is enabled, the request is processed if and only if the token included in the request matches the calculated SST. If session validation is disabled, the web server may, in some embodiments, continue to calculate SSTs, albeit without blocking any requests based on a token mismatch. In other embodiments, the web server may be configured not to calculate token values when session validation is disabled.

The client token included in the in-session request may be included as a cookie, e.g., within a cookie field of an HTTP header of the in-session request. The web server may distinguish initial requests from in-session requests based on the presence or absence of a session ID within the request and/or the presence or absence of a session cookie, i.e., a cookie that does not specify a duration. Accordingly, an initial request may be referred to herein as a pre-session request, which may include any request sent from a browser to a server before a session ID is established between the browser and server. The pre-session request may be a hypertext transfer protocol (HTTP) GET request, or another type of HTTP request, encapsulated in an IP packet.

The data items extracted from the pre-session request may include a first data item and a second data item. The first data item may identify any one or more attributes of the pre-session request including the client browser, client operating system, client browser author or vendor, and client browser revision. The first data item may include all or a portion of user agent data included in a user agent header field of the pre-session request.

The second data item may include some or all of a source IP address included in an IP header of the IP packet. In at least one embodiment, a network portion of the source IP address may be used as the second data item, i.e., a portion of the IP address that does not vary among different requests within a given session. This portion may comprise the upper or most significant 16 bits of a 32-bit IP (v4) address. Thus, generating the SST may include performing a hash of the network portion of the source IP address, the user agent data, and the session ID.

The token generation and verification functionality may be implemented in a session validation module The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Sessions and Session IDs are commonly used by Webservers and other HTTP based applications to maintain state information pertaining to the client-side user. A session ID or token binds user authentication credentials to requests and responses exchanged within the applicable session.

Figure 1:
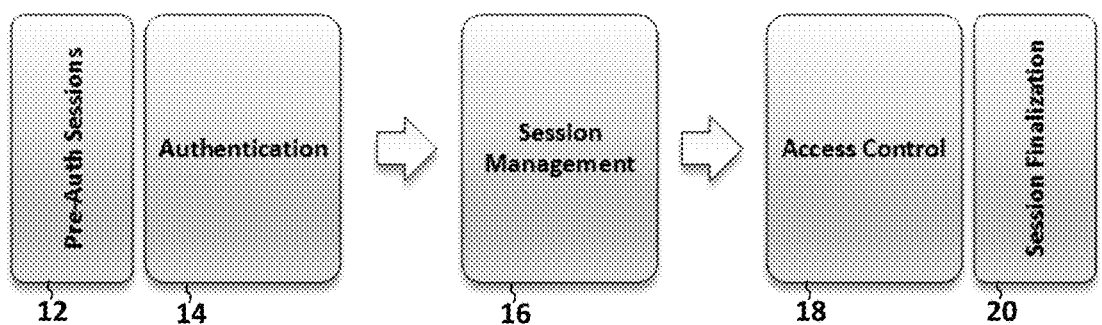
FIG. 1 illustrates components of a conventional session establishment.

FIG. 1 illustrates stages and elements of a typical HTTP session implementation 10. The implementation 10 includes pre-authentication (block 12), wherein the web server assigns a unique identifier, referred to as a session ID or session ID, to an anonymous user issuing requests from a particular instance of a web browser. Once a session ID is established, the session ID may be included within each in-session request and response that is part of the session. If the user provides a userID and password or another form of authentication (block 14) to the web server, the web server may perform session management (block 16) including updating the session ID to reflect authentication credentials and access control details (block 18), until the session is ultimately closed or otherwise finalized (block 20), e.g., when the user closes the browser.

Session IDs may be communicated in various ways such as by manipulating the uniform resource locator (URL) indicated in requests and responses, via a cookie that is identified by a request or response, as an argument in the body of a request, e.g., a POST request, within a hidden form field, and so forth in ways that will be familiar to those of ordinary skill in the art.

Responsibility for implementing and securely binding the authentication, session management and access control components illustrated in FIG. 1 lies primarily with the application developer because applicable development and deployment frameworks may not specify strict relationships. At least in part because application developers may vary in their experience with respect to implementing session IDs, Session IDs present an attractive target for attackers, who, after obtaining a Session ID surreptitiously, may hijack the user's identity and the applicable session.

Known techniques for obtaining session IDs include: session brute forcing, i.e., guessing; session hijacking or stealing, and session fixation; finger printing of session ID names used by the most common web application development frameworks including, as example, PHPSESSIONID, JSESSIONID (JSEE), CFID & CFTOKEN (Coldfusion), ASP.NET_SessioniID (ASP .NET); web traffic interception and manipulation including the use of Man-in-the-Middle/Browser-in-the-Middle attacks of unencrypted HTTP traffic to add or replace legitimate session IDs; reading HTTP meta tags (cookies), which HTTP may be unable to disable; the use of Web references or links that entice users to follow a link with the attacker's session ID; Cross-Site Scripting (XSS) that sets a session ID through JavaScript; exploiting the concept of Used vs. Accepted Sessions, for example, a web application that makes use of cookies as its default session ID exchange mechanism, may still accept other exchange mechanisms; and not renewing a session ID once authentication is completed.

Disclosed techniques and practices for preventing session hijacking may leverage and/or supplement one or more existing practices including, as non-limiting examples: requiring sensitive data be sent over HTTPS and preventing applications from accessing sensitive data via HTTP; the use of "secure" cookies and the exchange of session IDs via encrypted channels only; setting an $HTTP_{13}$ only attribute for each cookie, which instructs browsers not to allow JavaScript, VB script, or any other method that accesses cookies via a Document Object Model (DOM) document-.cookie object; limiting session ID exchanges to cookies and prohibit URL-based and other session ID exchange mechanisms; prohibiting or discouraging persistent cookies, which may have a lifetime of 10 years; requiring strict session ID and prohibiting permissive mechanisms that allow a web application to initially accept any session ID value set by the user as valid, e.g., accepting only those session ID values generated by the web application; defining and implementing appropriate session expiration policies including manual automatic expiration policies; web cache controls that reduce the possibility of inadvertently recording private or sensitive data in a web browser cache; and disabling browser cross-tab sessions by forcing the web browser not to share a session ID simultaneously between two or more tabs or windows, a technique that may not be feasible or practical for web applications that employ cookies as the session exchange mechanism because cookies may be shared by all browser windows.

Existing efforts to combat session ID hijacking may emphasize the transport protocol. Authorized use of HTTPS (SSL/HTTPS) involves annual service and certificate costs. In addition, the existing approaches to combat session hijacking may rely on the efforts and diligence of application developers, who may have little experience, desire, and/or incentive to devote resources to session management. For example, the application developer may be free to decide which security measures are implemented, how frequently or consistently measures are enforced, e.g., for every web page served, every time a cookie is defined, every time a URL includes or indicates session ID, etc. In addition, the application developer may be responsible for ensuring that new session IDs are renewed and/or created after successful authentications.

The application development framework may not enforce a strict relationship among the applicable session components of an application. While Web servers may include their own Session modules, web servers may lack a well-adapted mechanism/module to validate the Session IDs included within a request, instead often purely depending on the HTTPS protocol and the application owner to ensure security.

Disclosed subject matter encompasses a web server that includes a session validation module (SVM) configured to continuously monitor a Session ID for each and every user request submitted within the applicable session.

If suspicious activity is detected, the SVM may block the request. The disclosed solution raises the security bar for the attacker and makes it harder for an attacker to perform a successful attack. A disclosed web server may implement a setting or feature to easily enable or disable the SVM that permits administrators to enable/disable SVM for their web application.

Figure 2:
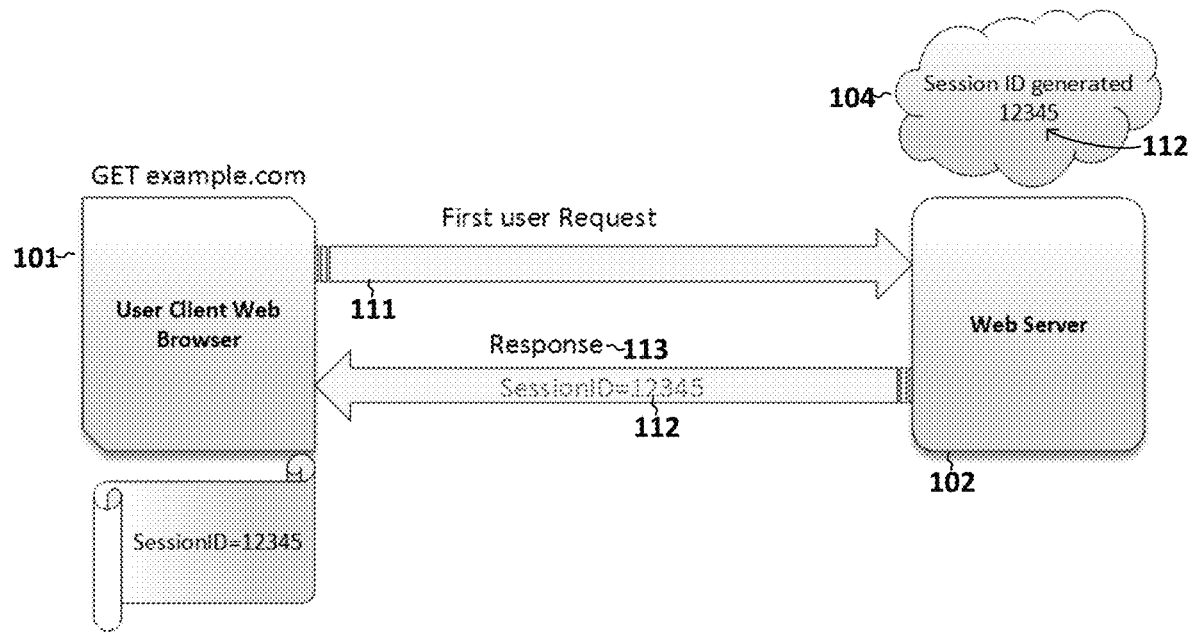
FIG. 2 illustrates communication between a client and Web based server.

FIG. 2 illustrates a web session in which a client web browser 101 sends a request(e.g., GET example.com), referred to herein as pre-session request 111, to web server 102. As suggested by its name, pre-session request 111 represents a request, from client web browser 101 to web server 102, that does not include a session cookie or other indicator of a session ID associated with web server 102. A pre-session request may correspond to the first request sent from the client web browser to the applicable web server after the client web browser is opened or otherwise instantiated on the client device.

Upon receiving pre-session request 111 from client web browser 101, web server 102 generates (block 104) a session ID 112 uniquely associated with client web browser 101 and sends client web browser 101 a response 113 that includes the session ID 112. As suggested previously, however, the session ID 112 within response 113 is vulnerable to detection by an authorized browser or other resource.

Figure 3:
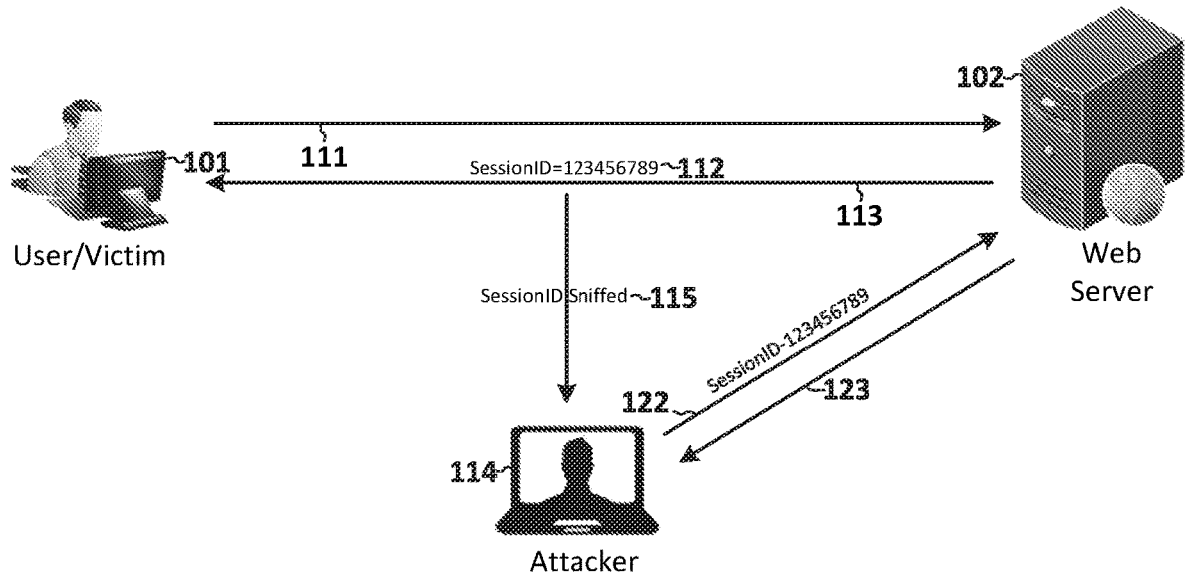
FIG. 3 illustrates a session hijacking example.

FIG. 3 illustrates the web session illustrated in FIG. 2 at a subsequent point in time. As illustrated in FIG. 3, a miscreant 114 has devised to sniff (operation 115) or otherwise illicitly obtain session ID 112 from response 113. Miscreant 114 is further illustrated sending a rogue request 122 to web server 102 wherein the rogue request 122 includes or otherwise indicates session ID 112. Because web server 102 has associated session ID 112 with client web browser 101, web server 102 may process rogue request 122 as it would process a valid in-session request from client web browser 101. The hijacking of the client web server's session by miscreant 114 is complete when web server 102 responds to rogue request 122 by sending hijacked response 123 to miscreant 114.

Figure 4A:
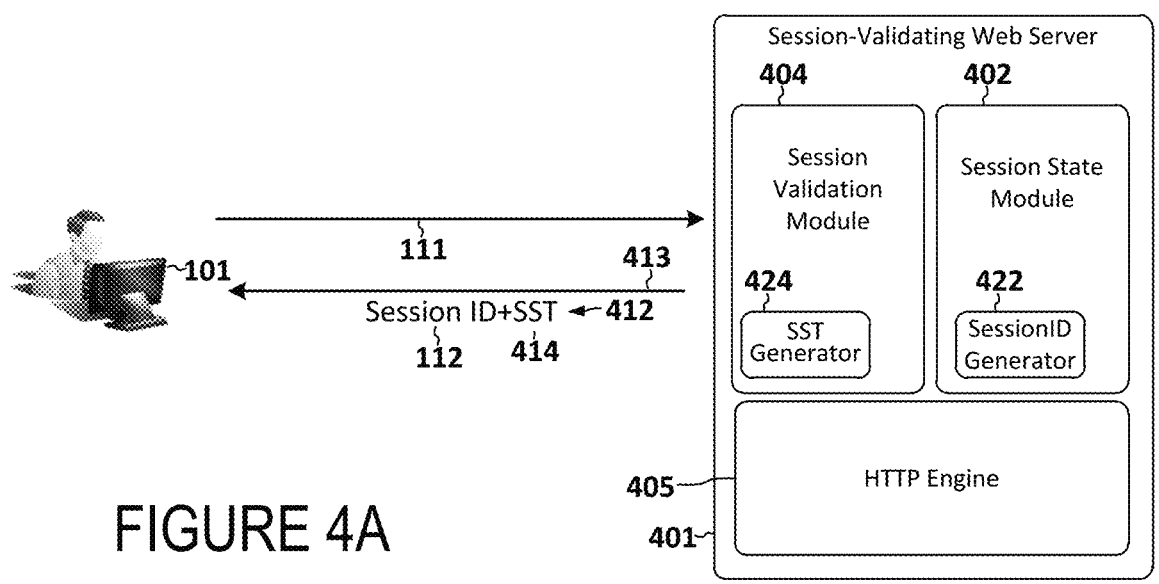
FIG. 4A and FIG. 4B illustrate operation of a disclosed session-validating web server.
Figure 4B:
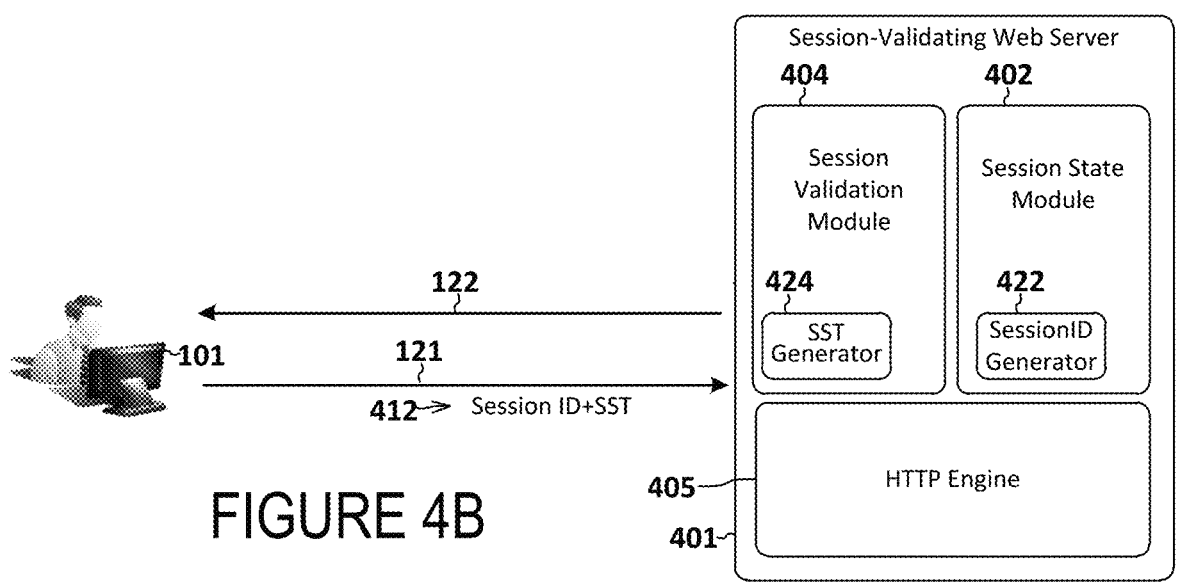

Turning now to FIG. 4A and FIG. 4B, the client web browser 101 of FIG. 2 and FIG. 3 is illustrated communicating with a web server referred to herein as session-validating web server 401. The session-validating web server 401 illustrated in FIG. 4A and FIG. 4B includes a front end, comprising a session validation module 404 that includes a an SST generator 424, a backend comprising a session state module 402 that includes a session ID generator 422, and an HTTP engine 405 that processes HTTP requests and generates HTTP responses.

In at least one embodiment, session state module 402 may support functionality substantially similar to the functionality supported by web server 102 (FIG. 2). In any such embodiment, session validation module 404 may represent the bulk of functional distinctions between web server 102 (FIG. 2) and session-validating web server 401 (FIG. 4A/4B).

As depicted in FIG. 4A, session-validating web server 401 responds to receiving pre-session request 111 from client web server 101 by returning a response 413 that includes a tokenized session ID 412. The tokenized session ID 412 illustrated in FIG. 4A and FIG. 4B comprises a simple concatenation of session ID 112 and SST 414. In other embodiments, however, tokenized session ID 412 may be the product of a more elaborate function of session ID 112 and SST 414.

In at least some embodiments, SST 414 is derived from information that is: (a) indicative of and/or associated with client web browser 101 and (b) conveyed to session-validating web server 401 within pre-session request 111. In these embodiments, the inclusion of SST 414 beneficially enables a session validation that is inherently and highly selective of the client web browser 101.

Figure 5:
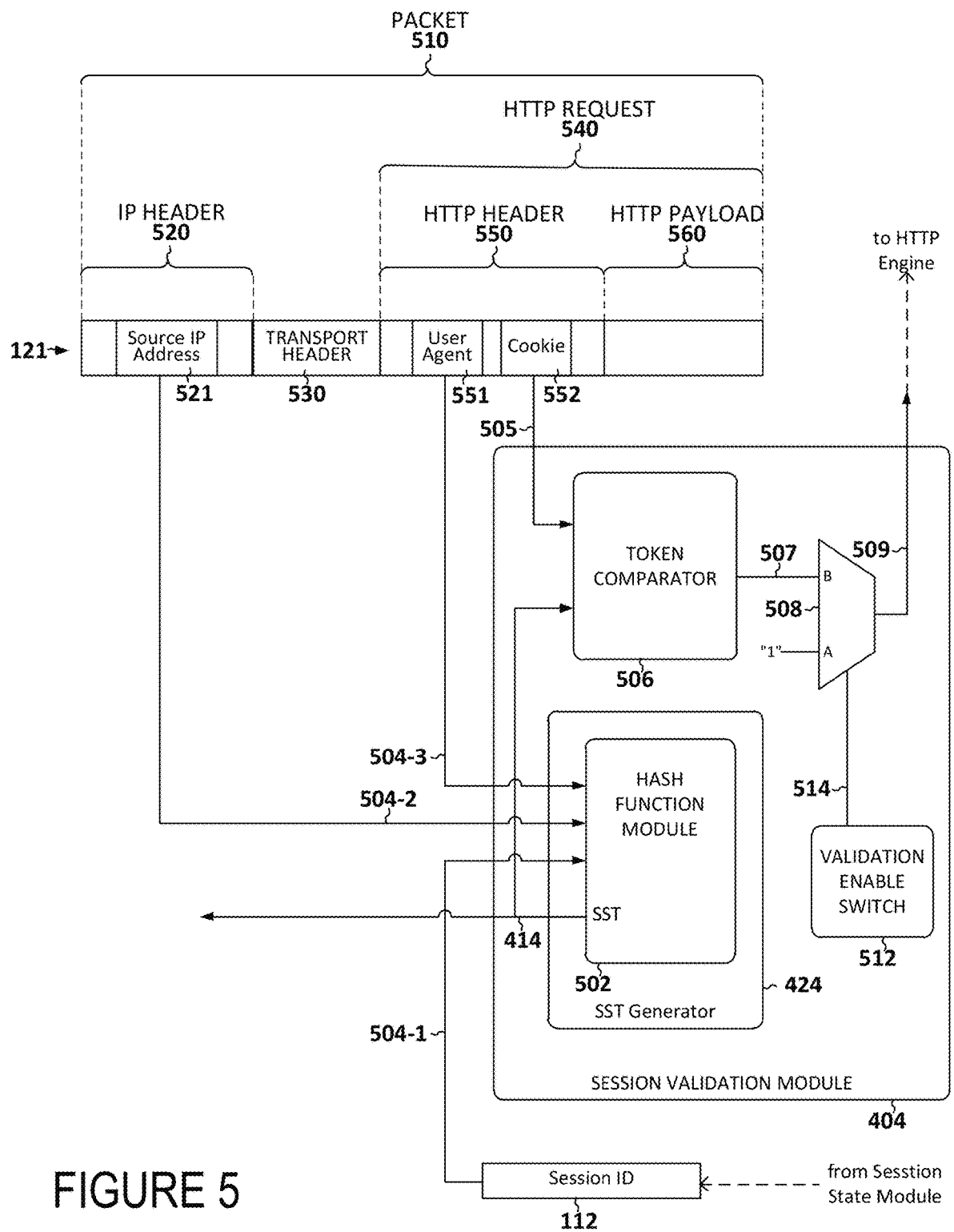
FIG. 5 illustrates elements of the session-validating web browser.

Referring to FIG. 5, selected elements of the session validation module 404 of FIG. 4A and FIG. 4B are illustrated in context with an in-session request 121. In-session request 121 is depicted as an HTTP request 540 encapsulated in an IP packet 510. IP packet 510 includes an IP header 520, a transport header 530, and the HTTP request 540. HTTP request 540 includes an HTTP header 550 and an HTTP payload 560.

The IP header 520 includes a source IP address field 521 that stores an IP address of the information handling resource that sourced in-session request 121, which may be an IP address associated with client web browser 101. The HTTP header 550 illustrated in FIG. 5 includes a User agent header field 551 that includes a user agent string identifying one or more attributes of the client web browser 101 (FIG. 1) and/or an information handling system in which client web browser 101 is implemented.

The SST generator 424 illustrated in FIG. 5 includes a hash function module 502 that receives SST inputs 504-1 through 504-3 and produces SST 414 as an output. The three SST inputs 504 illustrated in FIG. 5 include a first SST input 504-1 corresponding to session ID 112. The second SST input 504-2 illustrated in FIG. 5 comprises information included in or derived from source IP address field 521 in IP header 520 of IP packet 510. The third SST input 504-3 illustrated in FIG. 5 includes user agent information included in or derived from user agent field 551 in HTTP header 550 of HTTP request 540.

Incorporating source-indicative information, such as the SST inputs 504 provided to SST generator 424, beneficially produces an SST 414 that only validates in-session requests that originate from the same client web browser instance that sent the pre-session request 111.

In addition, it will be appreciated that no modification of client web browser 101 is mandated by the introduction of session validation web server 401. If, as an example, session ID 112 and SST 414 are communicated via cookie fields within in-session requests and responses, the validating performed by session-validating web server 401 may be entirely transparent to client web browser 101.

The SST 414 generated by hash function module 502 may serve two purposes. As previously described, an SST 414 may be included in a response to a web request from session-validating web server 401 and stored as a cookie on client web browser 101 for use in subsequent in-session web requests. In addition, however, an SST 414 may be generated, based on an in-session web request 121, by hash function module 502 for comparison with a request token 505 included in a cookie header field 552 of the in-session request 121. FIG. 5 illustrates token comparator 506 configured to perform this comparison and to assert its output 507 responsive to detecting a match between the SST 414 and the request token 505. Accordingly, in such embodiments, token comparator 506 is configured to assert comparator output 507 to indicate validation of the request token 505 included with in-session request 121.

In at least some embodiments, session-validating web server 401 may be implemented with a validation enable feature that provides a simple mechanism for enabling and disabling session validation. As illustrated in FIG. 5, for example, a session validation enable feature is implemented with token comparator 506, validation enable switch 512, and multiplexer 508. As implemented in FIG. 5, these resources generate a process request signal 509 that is provided to HTTP engine 405 (FIG. 4). In at least one embodiment, process request signal 509 is asserted to a logical "1" to enable processing of the applicable web request by HTTP engine 405. When process request signal 509 is maintained at logical "0," HTTP engine 405 may be disabled or otherwise prevented from processing web requests.

Validation enable switch 512 illustrated in FIG. 5 provides a control signal 514 to a control input of multiplexer 508. Control signal 514 couples either the "A" input or the "B" input of multiplexer 508 to the output signal 509. The "A" input illustrated in FIG. 5 is illustrated toed to a logical "1." The "B" input illustrated in FIG. 6 is connected to the comparator output signal 507, which indicates whether a token provided in an in-session web request successfully validates the web request.

Session validation may be disabled by toggling validation enable switch 512 until control input 514 couples the "A" input of multiplexer 508 to process request signal 509. Session validation may be enabled by toggling validation enable switch 512 until control signal 514 couples the "B" input of multiplexer 508 to process request signal 509. When the "B" input of multiplexer 508 is coupled to process request signal 509, process request signal 509 follows comparator output signal 507. Thus, with session validation enabled, the process request signal 509 is asserted, thereby enabling HTTP engine 405 to process the applicable HTTP request. The selection of logical "1" as the signal level enabling session validation is arbitrary and other embodiments may use logical "0" to enable session validation. Similarly, although FIG. 5 illustrates particular logic, devices, or other resources, other embodiments may employ different logic, devices, and resources to achieve the same or similar functionality.

Figure 6:
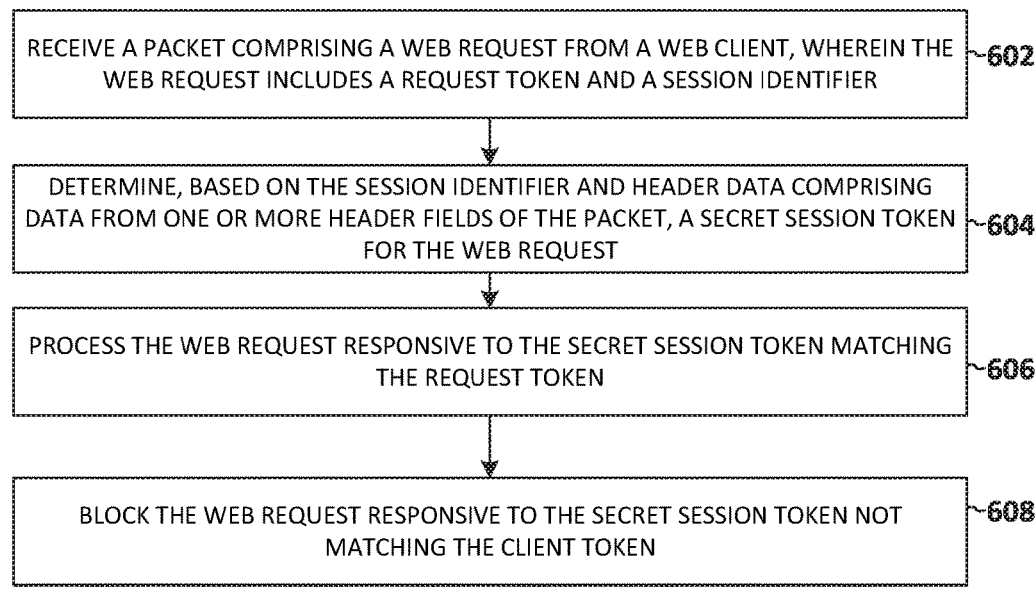
FIG. 6 illustrates a flow diagram of a method for managing web session identifiers.

FIG. 6 illustrates an HTTP session management method 600. Method 600 may correspond to methods performed by a web server such as the session validation web server 401 (FIG. 4). The method 600 illustrated in FIG. 6 includes receiving (operation 602) a packet comprising a web request from a web client, wherein the web request includes a client token and a session identifier and determining (operation 604), based on the session identifier and header data comprising data from one or more header fields of the packet, a secret session token for the web request. The web request may be processed (operation 606) responsive to the secret session token matching the client token and the web request may be blocked (operation 608) responsive to the secret session token not matching the client token.

Any one or more processes or methods described above, including processes and methods associated with any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A web server, comprising:
   a processor;
   a network interface to couple the web server to a network; and
   a computer readable medium including processor executable instructions that, when executed by the processor, result in operations comprising:
      receiving a pre-session request from a web client;
      extracting, from the pre-session request, one or more data items indicative of a source of the pre-session request;
      generating a session identifier corresponding to the pre-session request;
      generating a secret session token based on the one or more data items and the session identifier;
      sending a response to the pre-session request, wherein the response includes a tokenized session identifier indicative of the session identifier and the secret session token; wherein the tokenized session identifier comprises a concatenation, wherein the concatenation comprises the session identifier concatenated with and the secret session token;
      responsive to receiving an in-session request from the web client, performing a verification of a client token, included with the in-session request, against the secret session token;
      responsive to verifying the client token, processing the in-session request; and
      responsive to not verifying the client token, blocking the in-session request.

2. The web server of claim 1, wherein the client token included in the in-session request is included in a session cookie included with the in-session request.

3. The web server of claim 1, further comprising:
   determining, based on a presence or an absence of a session identifier within a particular request, whether the particular request comprises a pre-session request.

4. The web server of claim 1, wherein the pre-session request comprises a hypertext transfer protocol (HTTP) request and further wherein the pre-session request comprises an HTTP GET request.

5. The web server of claim 4, wherein extracting the one or more data items comprises, extracting a first data item indicative of a client browser corresponding to the pre-session request.

6. The web server of claim 5, wherein the first data item comprises user agent data included in a header of the pre-session request.

7. The web server of claim 6, wherein extracting the one or more data items comprises, extracting a second data item, indicative of a network address, corresponding to the pre-session request.

8. The web server of claim 7, wherein the second data item comprises a network portion of a source IP address of the pre-session request, wherein the network portion of the source IP address comprises a portion of the IP address that does not vary among requests within a particular session.

9. The web server of claim 8, wherein generating the secret session token includes performing a hash of:
   the network portion of the source IP address;
   the user agent data; and
   the session identifier.

10. A web server method, comprising:
    receiving a pre-session request from a web client;
    extracting from the pre-session request one or more data items indicative of a source of the pre-session request;
    generating a session identifier corresponding to the pre-session request;
    generating a secret session token based on the one or more data items and the session identifier;
    sending a response to the pre-session request, wherein the response includes a tokenized session identifier indicative of the session identifier and the secret session token, wherein the tokenized session identifier comprises a concatenation, wherein the concatenation comprises the session identifier concatenated with the secret session token;
    responsive to receiving an in-session request from the web client, performing a verification of a client token, included with the in-session request, against the secret session identifier;
    responsive to verifying the client token, processing the in-session request; and
    responsive to not verifying the client token, blocking the in-session request.

11. The web server method of claim 10, wherein the client token included in the in-session request is included in a session cookie included with the in-session request.

12. The web server method of claim 10, further comprising:
    determining, based on a presence or absence of a session identifier within a particular web request, whether the particular web request comprises a pre-session request.

13. The web server method of claim 10, wherein the pre-session request comprises a hypertext transfer protocol (HTTP) request and further wherein the pre-session request comprises an HTTP GET request.

14. The web server method of claim 13, wherein extracting the one or more data items comprises, extracting a first data item indicative of a client browser corresponding to the pre-session request.

15. The web server method of claim 14, wherein the first data item comprises user agent data included in a header of the pre-session request.

16. The web server method of claim 15, wherein extracting the one or more data items comprises, extracting a second data item, indicative of a network address, corresponding to the pre-session request.

17. The web server method of claim 16, wherein the second data item comprises a network portion of a source IP address of the pre-session request, wherein the network portion of the source IP address comprises a portion of the source IP address that does not vary among requests within a particular session, wherein the portion of the source IP address that does not vary among requests within the particular session comprises a most significant 16 bits of a 32-bit IP address.

18. The web server method of claim 17, wherein generating the secret session token includes performing a hash of:
the network portion of the source IP address;
the user agent data; and
the session identifier.

19. An information handling system, comprising:
a processor;
a network interface, configured to communicatively couple the processor to a network; and
a computer readable medium including processor executable instructions that, when executed, cause the processor to perform operations comprising:
receiving a packet comprising a web request from a web client, wherein the web request includes a tokenized session identifier, wherein the tokenized session identifier comprises a concatenation of a client token and a session identifier;
determining, based on the session identifier and header data comprising data from one or more header fields of the packet, a secret session token for the web request;
determining whether the secret session token for the web request matches the client token;
processing the web request responsive to the secret session token matching the client token; and
blocking the web request responsive to the secret session token not matching the client token.

20. The information handling system of claim 19, wherein said determining comprises:
hashing a combination of:
the session identifier;
at least a portion of a user agent string included in a user agent header of the web request; and
a network portion of a source IP address included in an IP header of the packet.

* * * * *